US009411072B1

(12) United States Patent
Dixon

(10) Patent No.: US 9,411,072 B1
(45) Date of Patent: Aug. 9, 2016

(54) REAL-TIME ADAPTIVE WEATHER SURVEILLANCE SYSTEM AND METHOD

(71) Applicant: Exelis Inc., McLean, VA (US)

(72) Inventor: Eric Marlin Dixon, Upper Marlboro, MD (US)

(73) Assignee: Exelis, Inc., Herndon, VA (US)

( * ) Notice: Subject to any disclaimer, the term of this patent is extended or adjusted under 35 U.S.C. 154(b) by 628 days.

(21) Appl. No.: 13/898,913

(22) Filed: May 21, 2013

Related U.S. Application Data

(60) Provisional application No. 61/787,995, filed on Mar. 15, 2013.

(51) Int. Cl.
  *H04N 7/18* (2006.01)
  *G01W 1/00* (2006.01)

(52) U.S. Cl.
  CPC ........ *G01W 1/00* (2013.01); *H04N 7/181* (2013.01)

(58) Field of Classification Search
  CPC .................. G06T 2207/30192; H04N 21/8126
  See application file for complete search history.

(56) References Cited

U.S. PATENT DOCUMENTS

| 6,970,183 | B1* | 11/2005 | Monroe ................. G08B 7/062 348/143 |
| 7,107,152 | B2 | 9/2006 | Fixman |
| 7,774,139 | B1 | 8/2010 | Rose et al. |
| 2002/0091692 | A1 | 7/2002 | Yoshida et al. |
| 2003/0107490 | A1 | 6/2003 | Sznaider et al. |
| 2003/0200027 | A1 | 10/2003 | Root et al. |
| 2008/0303693 | A1* | 12/2008 | Link, II ............ G08G 1/096741 340/905 |
| 2009/0002195 | A1* | 1/2009 | Horvitz ................ G08G 1/0104 340/934 |
| 2010/0131202 | A1 | 5/2010 | Dannevik et al. |
| 2012/0242835 | A1* | 9/2012 | Li .......................... G08G 1/167 348/148 |

* cited by examiner

*Primary Examiner* — Christopher Findley
(74) *Attorney, Agent, or Firm* — RatnerPrestia

(57) ABSTRACT

A weather surveillance system includes a data ingest module for receiving weather forecasts of a region, and multiple cameras for viewing targets of interest and providing imagery of the targets of interest, wherein the targets of interest are located within the region. The data ingest module also receives the imagery from the multiple cameras. The system also includes an analytics module for selecting at least one of the multiple cameras; a data fusion module for combining the received weather forecasts of the region with received imagery of the selected camera; and an output module which provides fused data to a user for verifying the weather forecast in the target of interest. The output module includes a web-based service module for collecting, storing and disseminating the fused data to the user.

25 Claims, 16 Drawing Sheets

Alerts

|  | All ▼ |
|---|---|
|  | All |
|  | Flash Flood Warning |
|  | Flood Advisory |
|  | Flood Warning |
|  | Severe Thunderstorm Warning |
|  | Special Weather Statement |

Special Weather Statement issued September 05 at 2:31PM EDT by NWS Indianapolis

Special Weather Statement issued September 05 at 2:23PM EDT by NWS Blacksburg

Special Weather Statement issued September 05 at 2:20PM EDT by NWS Louisville

Special Weather Statement issued September 05 at 2:20PM EDT by NWS Louisville

Special Weather Statement issued September 05 at 1:59PM EDT by NWS Blacksburg

Severe Thunderstorm Warning issued September 05 at 2:08PM EDT until September 05 at 3:00PM EDT by NWS Paducah Flood Warning issued September 05 at 9:58AM EDT until September 06 at 10:30AM EDT by NWS Miami Flood Warning issued September 05 at 9:26AM EDT until September 05 at 3:15PM EDT by NWS Tallahassee Flood Advisory issued September 05 at 12:31PM MDT until September 05 at 2:30PM MDT by NWS Albuquerque Flood Advisory issued September 05 at 2:28PM EDT until September 05 at 4:00PM EDT by NWS New York City - Upton Flood Advisory issued September 05 at 12:58PM CDT until September 05 at 2:00PM CDT by NWS New Orleans Flash Flood Warning issued September 05 at 1:53PM EDT until September 05 at 4:00PM EDT by NWS Boston Flash Flood Warning issued September 05 at 1:53PM EDT until September 05 at 4:00PM EDT by NWS Boston

Displaying alerts 1-13 of 13

FIG. 14

| Feature | Description |
|---|---|
| Mean Y Reflectance (linear) | The average linearized Y reflectance. |
| Std Y Reflectance (linear) | Standard deviation of linearized Y reflectance values |
| Mean Cb | Image is converted to YCbCr. Mean Cb is reported |
| Std Cb | Image is converted to YCbCr. Standard deviation of Cb is reported |
| Mean Cr | Image is converted to YCbCr. Mean Cr is reported |
| Std Cr | Image is converted to YCbCr. Standard deviation of Cr is reported |
| Mean Sat | Image is converted to YCbCr. Mean of Sat is reported |
| Std Sat | Image is converted to YCbCr. Standard deviation of Sat is reported |
| Mean Hue | Image is converted to YCbCr. Mean Hue is reported |
| Std Hue | Image is converted to YCbCr. Standard deviation of Hue is reported |
| StdTexture | For each Y pixel the standard deviation of a 3x3 pixel region is computed. The value reported is the mean value of all pixel calculations. |
| RangeTexture | For each Y pixel the abs difference between the max and min pixels values for a 3x3 pixel region is computed. The value reported is the mean value of all pixel calculations. |
| Mean Refl Ratio | The ratio of linear reflectance values between the reference image and detection image. |
| Mean Delta Cb | The average value of the pixel by pixel differences in the Cb image between the reference image and detection image. |
| Mean Delta Cr | The average value of the pixel by pixel differences in the Cr image between the reference image and detection image. |
| Mean Delta Sat | The average value of the pixel by pixel differences in the saturation image between the reference image and detection image. |
| Mean Delta Hue | The average value of the pixel by pixel differences in the hue image between the reference image and detection image. |

FIG. 15

| Classes: | |
|---|---|
| 1 | Sunny: Evidence of distinct shadows in the scene and some blue sky. Not Wet |
| 2 | Partly Cloudy: Distinct shadows, but may not have visible blue sky. Somewhere between Sunny and Cloudy. Not Wet |
| 3 | Cloudy: No distinct shadows, lambertian light source, no blue sky. Not Wet |
| 4 | Wet: Evidence of current or recent preciptation. |

FIG. 16

REAL-TIME ADAPTIVE WEATHER SURVEILLANCE SYSTEM AND METHOD

CROSS REFERENCE TO RELATED APPLICATIONS

This provisional application includes a priority claim to Provisional Application No. 61/787,995, filed on Mar. 15, 2013, which has been incorporated herein in its entirety.

FIELD OF THE INVENTION

The present invention relates, in general, to weather verification and, more particularly, to methods and systems for maintaining persistent surveillance of weather events over a selected region of interest on a real-time basis. The present invention also disseminates real-time ground-based video that confirms a weather event by using an integrated network of cameras and geospatial processing algorithms.

BACKGROUND OF THE INVENTION

Atmospheric weather forecasting uses a combination of science and technology to predict the state of the atmosphere for a given location. A mix of radar, satellite, forecast models and observational data are all used to assist forecasters. Conventionally, weather observation networks focus on the atmospheric conditions and ignore the area below the horizon where people live and drive. Thus, most weather data is primarily tailored to aviation, and not ground observation. An example of this is a tornado forecasted for a specific area. Real-time data, however, confirming this event is not available from current national weather assets. Forecasters may predict specific atmospheric conditions consistent with a specific weather event, but unfortunately cannot verify that the event is actually taking place, or will take place. Confirmation is left to local storm-chasers or amateur footage and reports that confirm the event by visual means and then report the event to forecasting agencies or local broadcast outlets.

The public, in general, relies heavily on accurate local weather information. The public in the United States (for example) primarily obtain information from local forecasters that decipher atmospheric data provided by government agencies. Emergency management agencies require accurate weather information to respond to local emergencies and provide warnings to the public. Private industries also rely on localized weather data. Private companies pay for weather forecasts tailored to their needs so that they can increase their profits or avoid losses. Weather forecast information has significant relevance for many markets, such as agriculture, transportation and insurance.

State and local governments operate ground-based observation systems which include close circuit television (CCTV) capabilities for winter road maintenance and traffic control. Local departments of transportation usually collect road and weather data from two or more sources, such as the National Weather Service (NMS) and Road Weather Information Systems (RWIS), and generate information for winter maintenance. Traffic CCTV cameras, however, are used primarily for traffic control. These CCTV cameras may be numerous, but are not coordinated for weather events nor do they have the intelligence to determine weather events without human "eyes-on-target".

The inability to observe weather events in real-time from a ground perspective produces uncertainty and results in ineffective response from emergency responders and decreased confidence from the general public. National data providers (NOAA, NWS) primarily produce atmospheric modeling and data which focuses on global views of weather, making local verification of events at a meso-scale nearly impossible. For example, two areas under the same weather warning may experience two different actual events. The lack of small-scale, real-time verification prevents effective warnings to the local community.

Finally, the above approaches fail to exploit an inherent benefit of a coordinated ground-based visual observation system. Visually being able to observe an event in real-time is a critical aspect for providing validation to atmospheric models and forecasts. Visual systems also allow sensing across a wide area.

As will be explained, the present invention solves the aforementioned deficiencies by autonomously maintaining persistent surveillance of weather events over a selected region of interest on a continuing basis, as well as selecting, controlling and tasking imaging assets to view the weather events. The present invention also provides real-time confirmation of weather events at a hyper-local level.

SUMMARY OF THE INVENTION

To meet this and other needs, and in view of its purposes, the present invention provides a weather surveillance system. The system includes a data ingest module for receiving weather forecasts of a region; and multiple cameras for viewing targets of interest and providing imagery of the targets of interest, the targets of interest located within the region. The data ingest module receives the imagery from the multiple cameras, and an analytics module selects at least one of the multiple cameras. A data fusion module combines the received weather data feeds (radar, in situ data stations, etc.) of the region with the data derived from analysis of received imagery of the selected camera(s). An output module provides fused data to a user for verifying the weather forecast in a target of interest.

The output module may include a web-based service module for collecting, storing and disseminating the fused data to the user. A browser may be included for communicating with the web-based service module, in which the browser is disposed at a location of the user. An application program may be included for selecting, by the user, the target of interest disposed in the region of weather interest.

The weather surveillance system includes a camera pointing or selecting module for selecting cameras based on a user's region of interest, as well as controlling an angular position of a field of view of one camera of the multiple cameras. The data ingest module is configured to receive the imagery in the field of view imaged by the one camera.

The multiple cameras may include a closed circuit television camera. The multiple cameras may also include a handheld camera of a smart-phone.

A web application server may communicate with the user to provide the fused data in response to the user request. The fused data may include an area of a map enclosed by a polygon and imagery received from a camera located within the polygon. The polygon may be selected by the user via the Internet. The camera may also be selected by the user via the Internet. The imagery may be provided to the user from the web application server.

Another embodiment of the present invention is a real-time weather surveillance system. The system includes a data ingest and conversion module for receiving weather data from a weather service provider, in which the data ingest and conversion module is configured to receive imagery from a camera, in response to angular control. A camera pointing module controls an angular direction for imaging a target of interest, and a web application server fulfills requests from a browser of a user. The user may request imagery of a camera, at an angular direction, and the web application server may provide imagery of the camera and the weather data from the weather service provider to the user.

The weather data from the weather service provider is of a region, and the imagery from the camera is of the target of interest which is a portion of the region.

The web application server fuses the camera imagery of the target of interest and the weather data from the weather service provider of a region of a map enclosed by a polygon. The camera includes at least either a closed circuit television camera or a hand-held camera of a smart phone.

The present invention also includes a method of real-time weather surveillance comprising the steps of:

receiving weather data of a region from a weather service provider;

receiving imagery from a camera taken of a target of interest, wherein the target of interest is a subset area of the region;

fusing the weather data and the imagery; and providing the fused data to a user.

The method may include the steps of:

requesting, by the user, imagery of the target of interest from a specific angular direction; and providing the fused data includes providing the imagery from the specific angular direction requested by the user.

Fusing the data may include providing the following:

(a) a diagonal enclosing a region on a map, in response to the request from the user, and (b) imagery of the target of interest located within the diagonal on the map.

It is understood that the foregoing general description and the following detailed description are exemplary, but are not restrictive, of the invention.

BRIEF DESCRIPTION OF THE FIGURES

The invention may be best understood from the following detailed description when read in connection with the accompanying figures:

FIG. 11$b$ is an example of an adjusted image in accordance with an embodiment of the present invention.

FIG. 12$b$ is an example image of sky identification in accordance with an embodiment of the present invention.

FIG. 12$c$ is an example image of other region identification in accordance with an embodiment of the present invention.

FIG. 14 is an example of an alert summary in accordance with an embodiment of the present invention.

FIG. 15 is an example of different features that may be identified by the present invention.

FIG. 16 is an example of a few classes that may be used in identifying an image, in accordance with an embodiment of the present invention.

DETAILED DESCRIPTION OF THE INVENTION

The present invention provides a real-time adaptive weather surveillance system. The system, in one embodiment, includes the following functions: (a) a hyper-local ground-based weather verification and advisory service; (b) an inter-jurisdictional resource/data provider that collects and disseminates ground-based weather observations to public/private entities (such as transportation, insurance, broadcast media, etc.); (c) a road weather information service (RWIS) that multiplexes output data via electronic switching systems (ESS); (d) an improved weather data source that supports general purpose weather forecasting; (e) a ground-based weather observation service integrated with other observation data for improved modeling of the atmospheric boundary layer and the near surface of the Earth; and (f) an integrated web-based service for the collection, storage and dissemination of coordinated ground-based video, still imagery and derived observational data from private/public CCTV networks.

Figure 1:
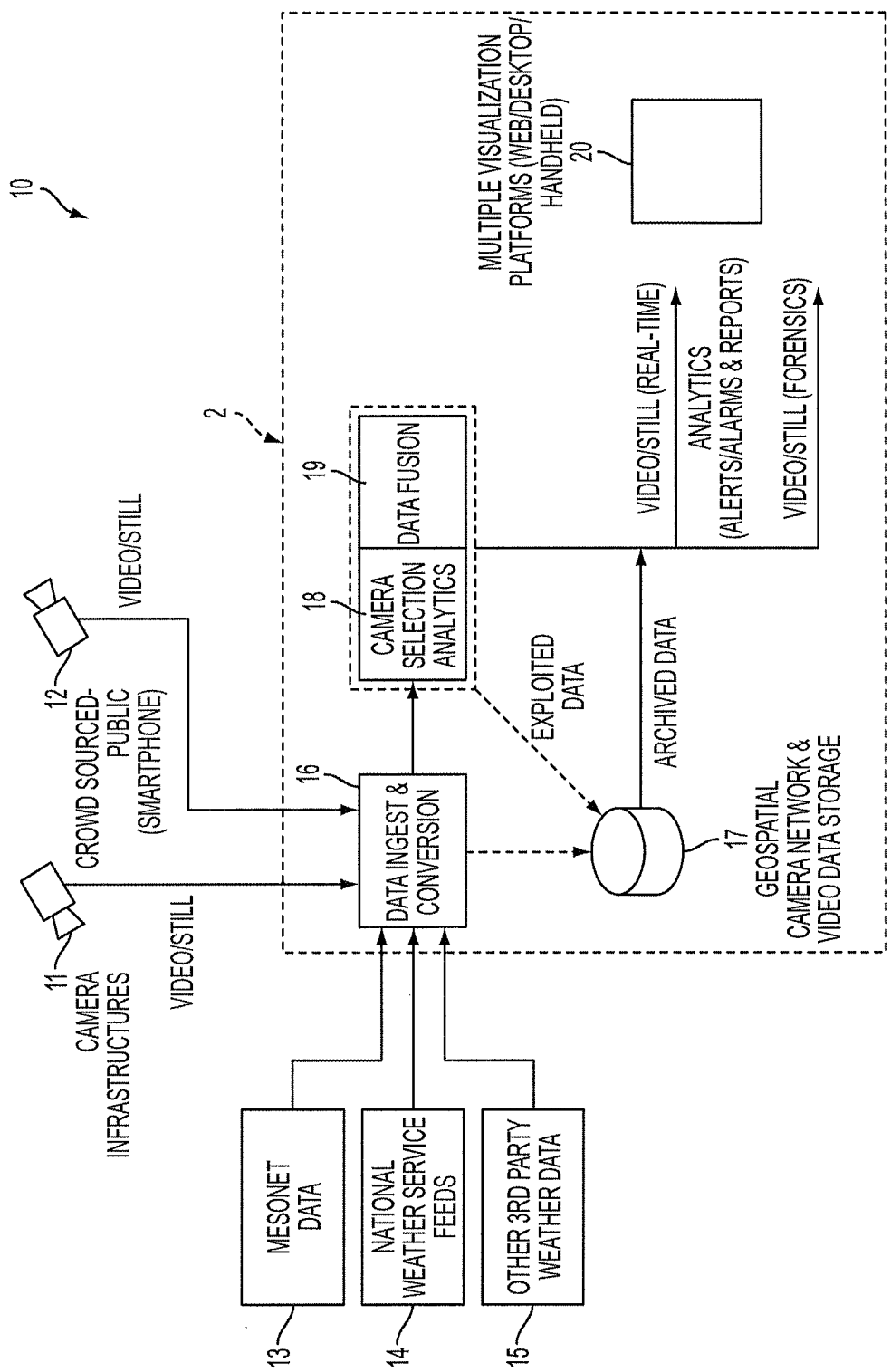
FIG. 1 is an exemplary real-time adaptive weather surveillance system, in accordance with an embodiment of the present invention.

Referring now to FIG. 1, there is shown an exemplary real-time adaptive weather surveillance system, generally designated as 10. The system 10 combines weather tracking and coordinated real-time ground-based video/still image capture, processes the combined data, and makes it available to the greater weather community. Ground-based weather data collected by system 10 includes raw weather data from public and private sources, such as Mesonet data stations 13, National Weather Service feeds 14, and other third party weather providers 15. Various ground-level camera video and still imagery from terrestrial camera networks (such as traffic and public/private imagery sources), generally designated as 11, are available to system 10. In addition, video/still imagery from web-enabled cell phones and smart-phones, designated generally as 12, are available to system 10.

Mesonet data stations are monitoring stations that are spaced close together and are adapted to capture weather data more often than the National Weather Service feeds, in order to allow for finer resolution of weather data. The processed data from the Mesonet is combined with weather prediction models operating on the National Weather Service data to predict the short-term weather at the neighborhood scale.

An important element of system 10 is a camera network ingestion and storage system, which is integrated with a fusion module for visualization of weather related data. This includes geographic tracking of severe storm and other related warnings and radar data at national and hyper-localized levels and coordinating terrestrial camera networks to track selected storms, thus enabling a user the ability of visualizing a weather event from the ground at multiple vantage points. As shown in FIG. 1, system 10 includes data ingest and conversion module 16, geospatial camera network and data storage module 17, camera selection analytics module 18 and data fusion module 19. The aforementioned modules are also referred to herein as system 2.

By processing the appropriate cameras, and applying image analytics through camera selection analytics 18, and fusing the data from the selected cameras with other weather related data from the data ingest and conversion module 16, the system is effective in providing real-time information and/or forensic information to multiple visualization platforms 20. These visualization platforms 20 may include handheld smart-phones and desktop processing display units operated by multiple users.

The visualization platforms 20 display real-time video/still imagery of relevant ground weather conditions. The data fused for visualization, by way of analytics module 18, is dynamic and persistent in nature, as the system continuously attempts to store and disseminate current severe weather information in a coordinated manner, based on national forecasts and warnings. A user, at a visualization platform, via a network such as the Internet, selects a region of interest. The system 10 tracks that region of interest, throughout the camera network. As the storm progresses, cameras are added and others are dropped by the camera selection analytics module 18. As the storm is tracked, the system records and stores relevant imagery in video storage module 17, based on the user's interest.

As will be explained, the system provides automated alerts, as the storm is tracked and the user may view the storm from any directional vantage point. The user, in fact, may switch camera viewpoints as the storm progresses across the region of interest. The algorithms provided in the analytics module and data fusion module form the user alarms and alert tools (such as weather condition detection algorithms) by effective use of the video assets and the ground level environmental weather data. The system 10 increases camera usage, which conventionally would place a heavy burden on monitoring personnel, such that after short periods (30 minutes) of continuous video monitoring, an operator would often miss important scene activity. The present invention, however, is effective in ingesting unstructured data (imagery) and producing value-add structured data, by using specific semantics in the data ingest and conversion module 16. Different algorithms allow the system to identify severe weather events, detect snow, estimate cloudiness, detect fog and determine visibility limit, detect precipitation and its movement direction, detect hydrologic water level, and extract features such as a tornado and lightning.

A user of the present invention may also determine a specific weather event to monitor at a particular location without having to continuously view each camera. By applying a specific detection tool (algorithm) on a selected camera, the present invention provides an alert to the user when the specific weather event has occurred. Through a one-stop Internet portal or an application programming interface (API), the user is provided with all ground-based observations that are coordinated for each storm across the continental United States (for example). The present invention also accommodates different types of users and fuses the data from multiple sets of imagery and weather forecasting feeds as a function of user fulfillment.

The system 10 collects data (video/still imagery) from specific camera networks based on storm warning geographic locations and user inputs, organizes and stores the data (if requested by the user), and disseminates the data in real-time for use by service providers and other customers of the system. Due to the large volume of data involved in this process, in one embodiment, system 10 only stores data upon a user selected weather event and does not continuously store all data being ingested into the system. The system 10, in one embodiment, therefore, includes a DVR-like capability in which the user may select a camera and store its feed.

While there are many types of ground-based environmental data that may be collected, the emphasis of the present invention is to provide ground-based weather verification and real-time observation. As such, the present invention focuses on those weather elements (video/still imagery) that have a direct bearing on enhancing the verification of localized weather events. Other ground-based environmental data elements are described in the NTCIP 1204 Standard for Environmental Sensor Station (ESS) and are also potential environmental data elements included in system 10.

There are temporal considerations for the data collection, processing, and dissemination of fused data in the system. There is a period for which the customers of Service Providers have temporal-driven requirements. The system 10, therefore, considers these time horizons and provides algorithms for data processing and distribution that accommodates these time horizons. The algorithms provided by the present invention are capable of processing, detecting and verifying a weather phenomenon within 1-3 minutes of an event.

One type of end user is expected to directly access the data published by the system through its web portal. This data is provided by a web application which allows the end user to track local storm warnings and/or radar data and visualize video and/or still imagery from ground camera networks from different vantage points. The system allows end users, or customers to access multiple sets of data (storm type, geographic location, regional area, demographic, etc.) in response to a subscription-based authentication method. In one exemplary embodiment of the present invention, a customer receives the data through a portal based UI that presents weather storm information juxtaposed over a camera network, with appropriate camera views displayed based on the customer's selected vantage point.

Figure 2:
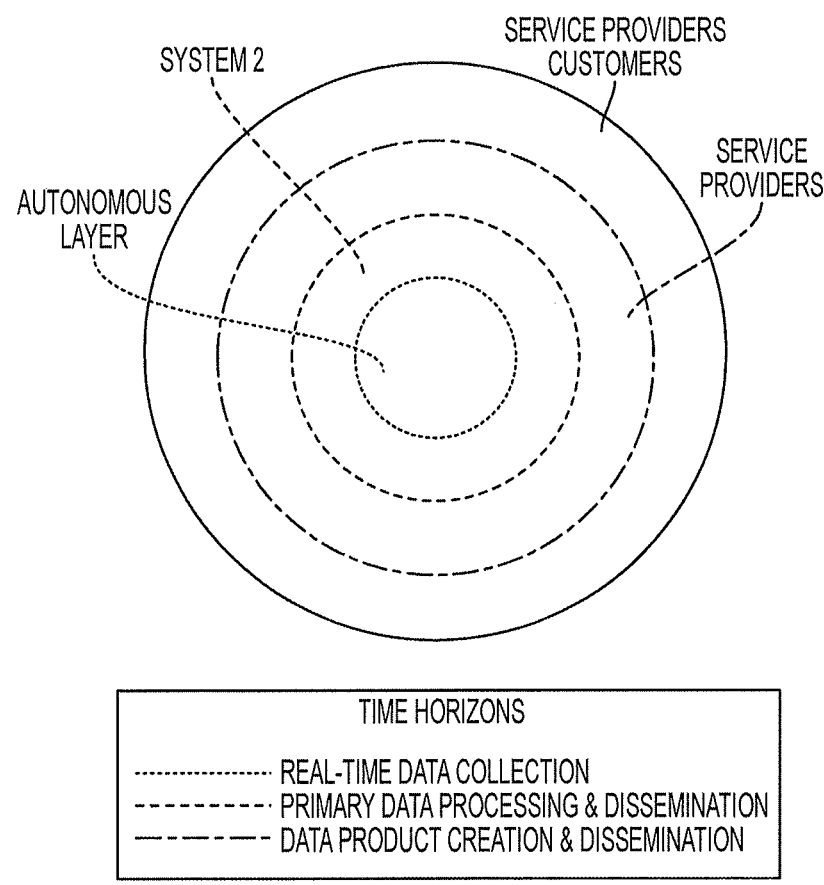
FIG. 2 is an example of various layers surrounding the collection, processing and dissemination of real-time weather events to end users of the system shown in FIG. 1.

The users are viewed as layers in the process of transferring data from raw field observations to various levels of data use. This is illustrated in FIG. 2. The autonomous layer, shown in the center of the figure, is comprised of operational entities that utilize weather data to make plans, decisions, and/or take actions based upon sensor data within their control. Such data includes observations collected by ESS, mobile data acquisition platforms, cameras and other transportation-related measurement devices. The autonomous layer comprises the vast majority of the raw input data to system 2 of the present invention. The system 2 layer lies between the autonomous and service provider layers and represents the architecture to coordinate terrestrial camera data with weather provider feeds of data, and manage the data for the end user.

The service provider layer is composed of both public and private entities that provide basic and value-added weather support services to the weather information needs of the broader community. The present invention contemplates that these support services now receive data (raw and processed) combined with other environmental, road condition, or traffic information products to provide road weather information and other products. The end user of the present invention includes the service provider customer layer, shown as the outer layer in FIG. 2. The service provider customer layer includes those groups who are direct consumers of products generated by the service provider layer, as well as the system 2 layer of the present invention.

Figure 3:
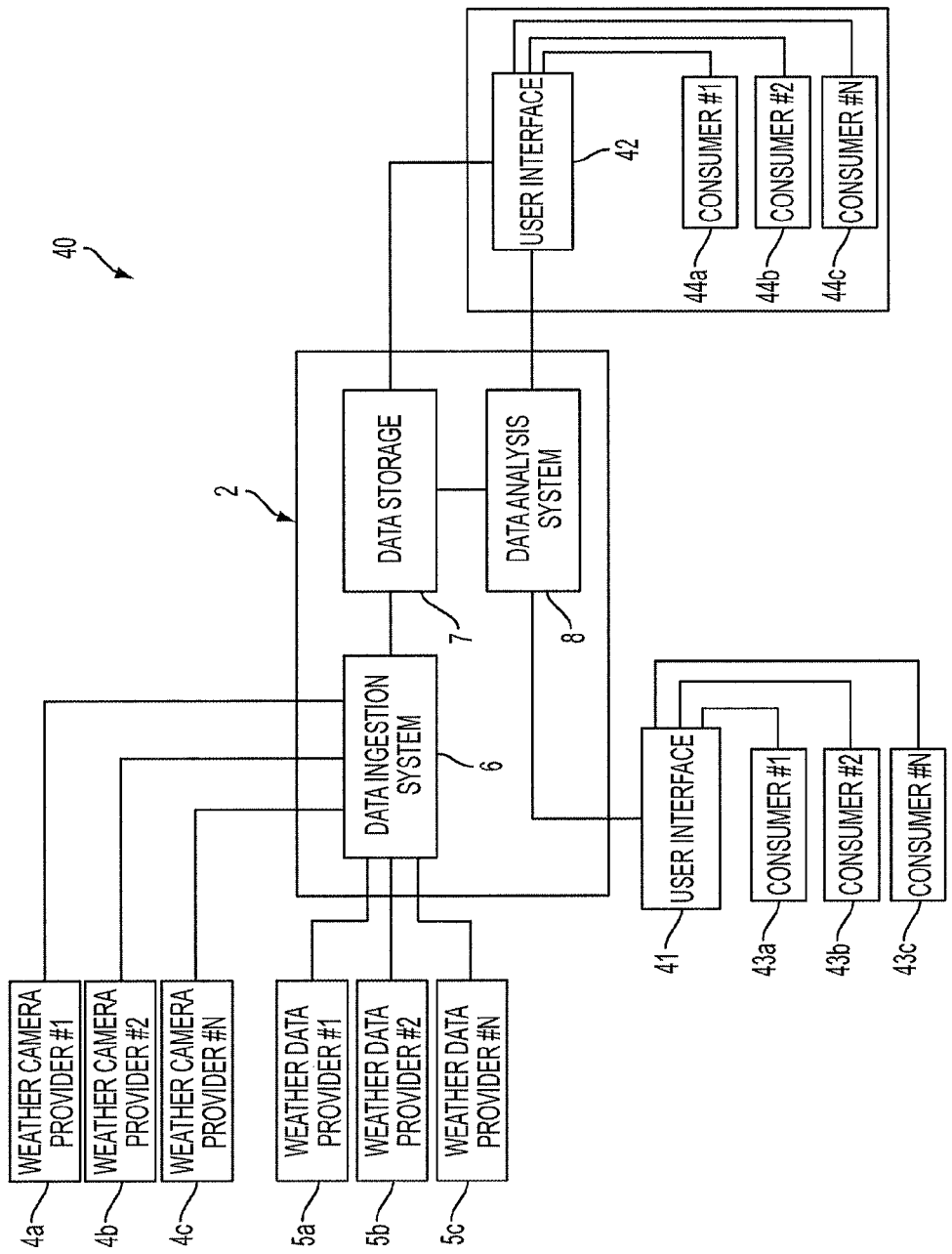
FIG. 3 is a another exemplary real-time adaptive weather surveillance system, in accordance with an embodiment of the present invention.

Referring next to FIG. 3, there is shown another adaptive weather surveillance system, generally designated as 40, which is consistent with the layers shown in FIG. 2. The data provider organizations maintain data collection systems. These organizations make up the autonomous layer, which includes organizations such as weather camera providers 4a, 4b and 4c for providing video/still imagery, and weather data providers 5a, 5b and 5c for providing feeds of weather data. The system 2 layer includes data ingest system 6 for receiving and ingesting the raw and processed data from the autonomous layer providers. Also included in system 2 are data storage system 7 and data analysis system 8 for storing and processing the ingested data, respectively. The service provider layer includes user interfaces 41 and 42, which provide control and management of requests from different types of consumers. The user interfaces may be an Internet provider communicating with a remote browser residing in a consumer's desktop computer or mobile device. The user interfaces may also include other means of communications between one entity and another. The service provider's customer layer includes consumers 43a-43c and 44a-44c, which communicate with user interfaces 41 and 42, respectively.

Figure 4:
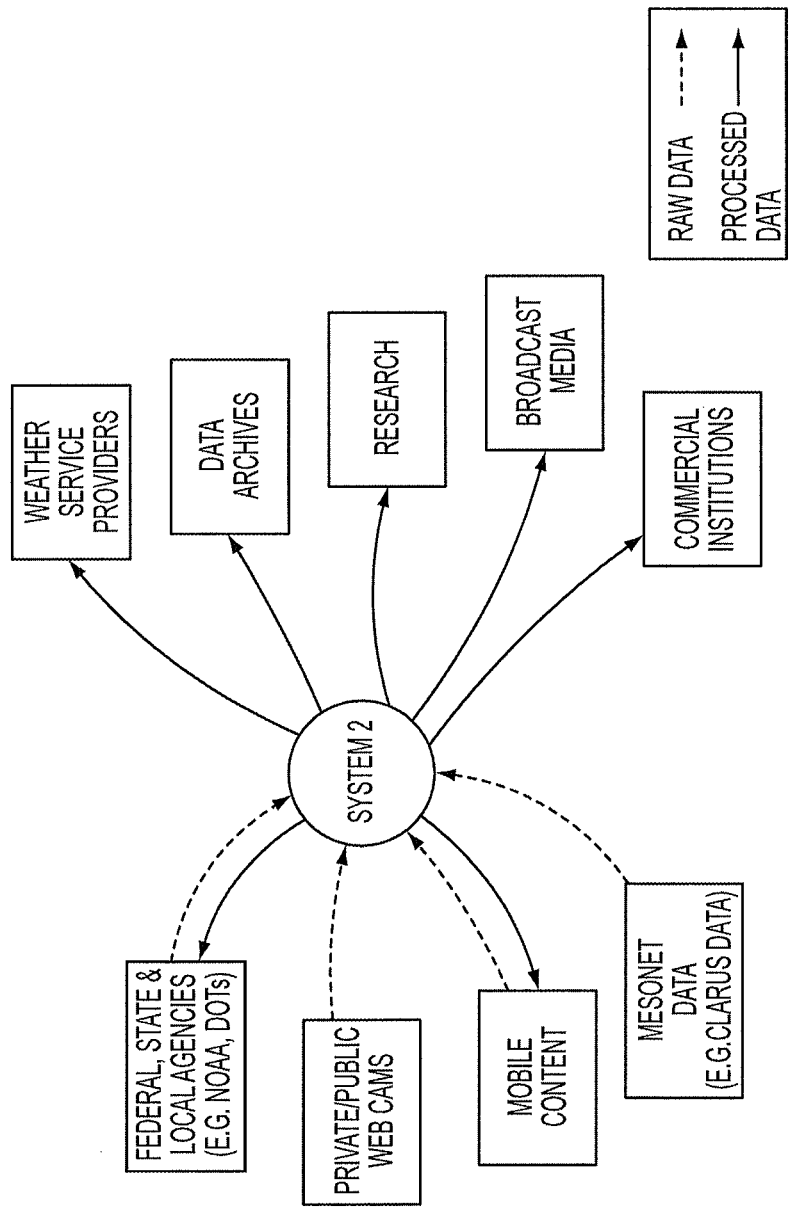
FIG. 4 is an example of raw data inputted into, and processed data outputted from the system shown in FIG. 3, in accordance with an embodiment of the present invention.

FIG. 4 illustrates an exemplary relationship among entities interfacing with system 2 (FIG. 3) of the present invention. The figure also shows the flow of data among the entities and system 2. The data provider organizations maintain data collection systems. These organizations make up the autonomous layer, which is the primary contributor of camera data to the system 2. The private and public sector service providers, broadcast media and commercial institutions are likely the principal users of system 2 of the present invention. Service providers generate value-added weather information services to the community in general. Broadcast media use the services from system 2 to provide weather information to the public in general. Commercial institutions use system 2 to improve safety, enhance logistics and provide improved profits related to severe weather. Additional service providers, which likely have direct access to data resources of system 2, include research organizations, and external agencies that may choose to archive data from system 2.

Any user, as defined in FIG. 4, may be capable of tracking existing storm warnings. For example, a user may select a point, or create a geographic location (such as a polygon) on a map which is of interest to the user. The system 2 may be effective in coordinating existing camera network assets at such location and provide video/still imagery of the location. As one type of video/still imagery provided by system 2, it is contemplated by the present invention that a "Google-like" street-view may be provided to a user to visualize real-time street-level weather event.

The system 2 retrieves and disseminates large volumes of data from a variety of sources at high rates. The system 2 includes an architecture that spreads its data collection and dissemination processes across multiple servers and communication channels. Furthermore, system 2 is scalable and capable of expanding and adding new data sources and end-users.

In order to maximize system uptime, redundancies may be provided at both the hardware and software levels of system 2. The system 2, however, has a great advantage over other conventional weather warning system in that system 2 may operate with the existing infrastructure. Since system 2 is not replacing any existing application, system 2 is not critical to any operational function; neither is it critical to any national security missions. Nonetheless, once system 2 is interfaced into the general adaptive weather surveillance system 10 in FIG. 1, or system 40 in FIG. 3, many customers and end users may use the information from system 2 in their normal management and operations of their infrastructure. If system 2 fails, however, requestors may simply fall back on their legacy systems.

It is anticipated that the system may be "open," implying that it uses architecture and communication interfaces that are non-proprietary and broadly supported within the information technology (IT) industry.

Figure 5:
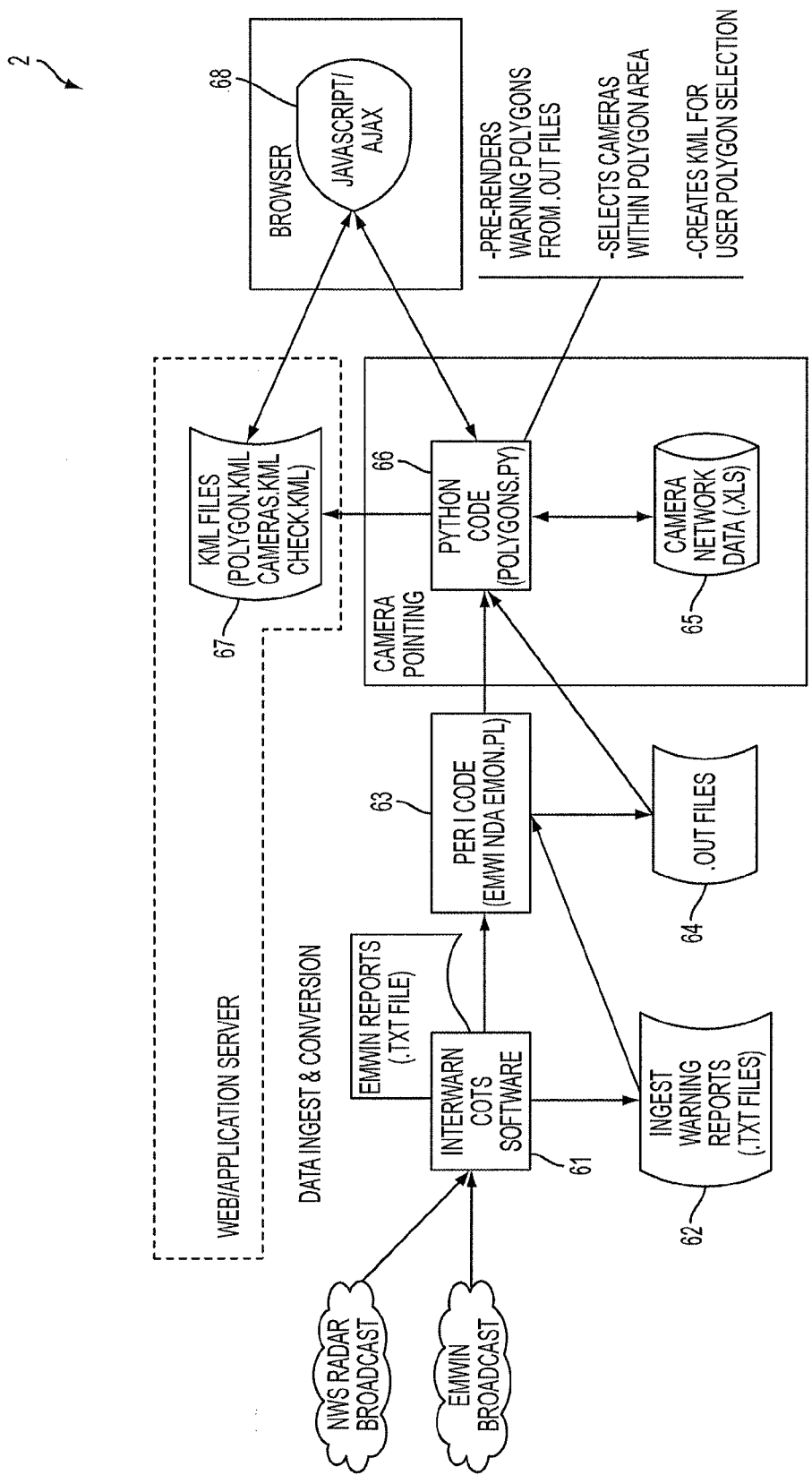
FIG. 5 is an exemplary architecture of the system shown in FIG. 3, in accordance with an embodiment of the present invention.

An exemplary architecture of system 2 is shown in FIG. 5. The architecture, in general, is framed around rapid development languages (Perl, Python, and JavaScript) in order to quickly produce a workable system for demonstration purposes. Referring now to FIG. 5, components of system 2 are shown as one example that may quickly produce a workable system for demonstration purposes. As shown, system 2 ingests National Weather Service (NWS) broadcasts of severe storm warnings via the NOAA Internet portal. This is accomplished via a COTs software module referred to as InterWarn module 61. The InterWarn module processes NWS warnings every 1-2 seconds, when a warning is issued. The InterWarn module outputs a report in text format (*.txt), which is placed in a directory, designated as 62.

A Perl daemon script 63 periodically examines a specified location in directory 62 for warning files and then parses the reports by outputting the warnings as a text file (.out) with polygon vertices in latitude and longitude format (tuples), storm center point (latitude, longitude), azimuth (in degrees) and velocity. The text file is designated as 64.

The system 2 maintains a database 65 (for example, an Excel spreadsheet) which contains camera geographic locations (latitude, longitude) and camera video/still imagery linkages obtained from camera network operators. The camera network spreadsheet in database 65 is dynamic and fully expandable.

A Python script 66 receives outputs from text file 64 and database 65, and determines which cameras are within the polygon. The Python script 66 outputs a listing of the cameras determined to be within the polygon as Keyhole Markup Language (KML) files 67. This is provided to the browser for eventual display to the end user.

Figure 6:
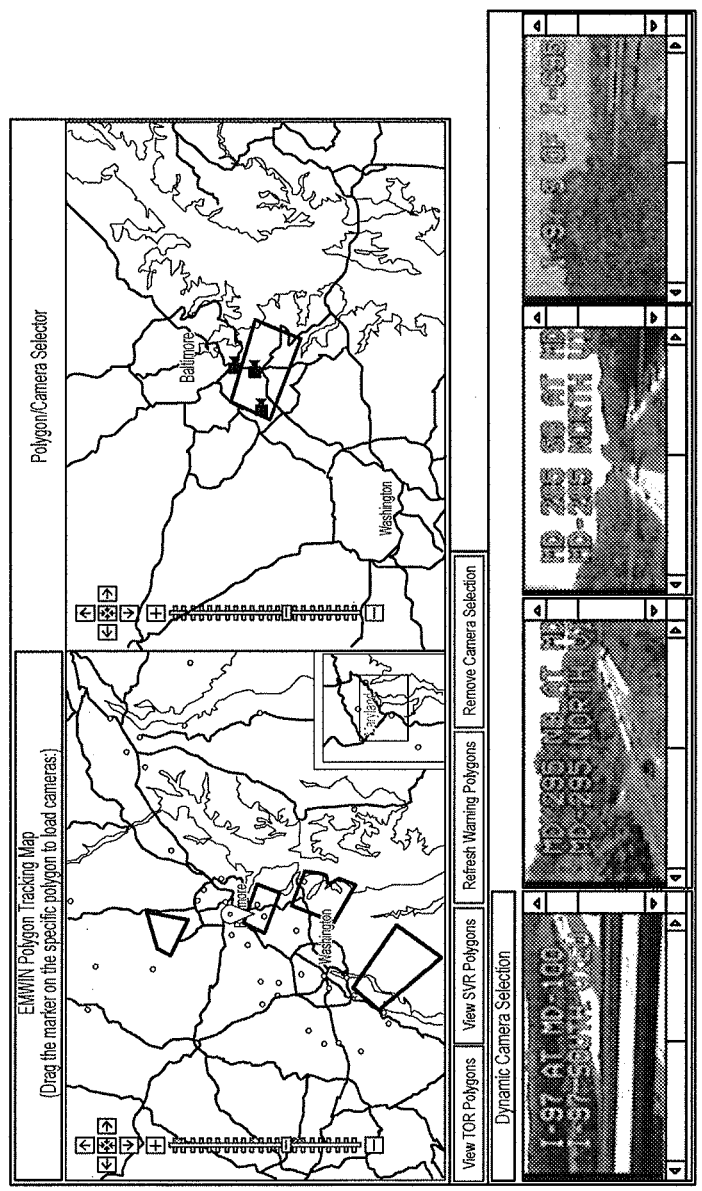
FIG. 6 is an example of a user interface (UI) in a web application used by an end user of the present invention.

JavaScript 68 is used to present the mapping components, using Google v3 API and Asynchronous JavaScript and XML (AJAX) to make direct calls to the server for the KML data. The storm warning polygons from the report are rendered as KML and displayed on a map, as shown in FIG. 6. The Python script may be executed periodically and renders the output files 64 that are within a specific timestamp. Thus, the map is updated with new polygons as they are processed.

FIG. 6 depicts an example of a web application user interface (UI). The user is presented with a mapping interface which tracks current storm warning polygons in real-time. The user may select any storm warning polygon on the left side and have system 2 select appropriate cameras (shown on the right side). The warning polygons are periodically refreshed with the latest warning data pushed from the server ingest process. The user is presented with real-time video of the selected cameras, as shown on the UI bottom.

Further improvements to the UI may include enhanced GIS-type selection criteria for camera selection. An example of this is for the user to select a bearing for viewing the storm from the center of the storm and select a distance from the center of the storm.

In another embodiment of the invention, system 10 may be able to support the detection of wetness, for example, from a network of cameras 11 and 12 with publicly available imagery. The cameras 11 and 12 may provide near real time information of conditions on the ground at different locations and may be part of thousands of cameras located around the country (e.g., U.S.A). The collected information may be used to provide real time feedback on weather events. These events may include flooding, snow, rain, tornadoes, etc.

The cameras, however, tend to be low resolution with frame rates less than 1/sec. and as long as multiple minutes/frame. The images may also vary in scene content, exposure, flare, dynamic range, white balance, tone scale and image overlays (logos, labels, banners, etc).

The system may classify an image as either "wet" or "not wet". For example, a reference image and a detection image may be used in the system. Specific features may be extracted by comparing the two images. The extracted features may be used to train a neural network, for example, in order to classify the detected image.

Figure 7:
FIG. 7 is an example of a reference image according to an embodiment of the present invention.

The reference image may be specific to a given camera. For example, data ingest and conversion unit 16 of system 2 may receive multiple images from camera infrastructure 11. Specifically, camera selection and analytics 18 may select a camera that is used to acquire a reference image for further processing. An example of a reference image is shown in FIG. 7. The reference image may be acquired under the following conditions:

1. Image is collected on or about mid-day such that long shadows may be minimized and the color temperature of the illuminant represents direct midday sun. This tends to be a typical condition and reduces variation in the population of reference images. A dominant "skylight" indirect illuminant or cloudy day cool lighting may be avoided during a warm early or late day sun.
2. Time selected may be such that the sun and camera angle do not cause specular reflections, or sheen on road surfaces.
3. The reference image may be updated with a frequency that changes in the scene captured. These changes may be seasonal or in response to a change in precipitation (e.g., grass turning brown due to a recent lack of rain), or physical changes (e.g., construction).

Figure 8:
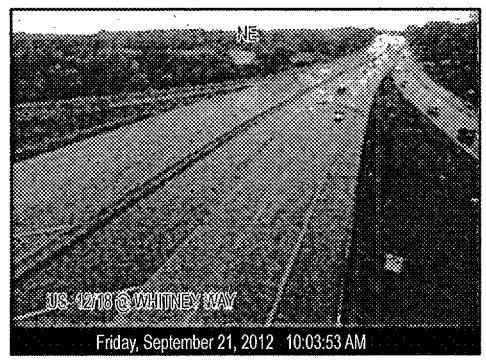
FIG. 8 is an example of a detection image in accordance with an embodiment of the present invention.

The reference image then becomes the standard against which a "detection image" is judged. The "detection image" is the image that may be tested for the presence of "wetness". An example of a detection image is shown in FIG. 8. The detection image may be acquired and further processed by the camera selection and analytics module 18.

A number of features or measurements may be extracted (these features will described in a later section) from a multiple of reference and detection images.

There are several methods contemplated by the present invention to predict or classify an image, as "wetness". Examples of methods are multi-variant regression, logistical regression, partial least squares, neural networks, etc. In one embodiment of the present invention, the following method may be performed by the camera selection and analytics module 18:

1. Form a training set of images that represent the universe of images that may be subjected to analysis. The variety of images may include the set of weather events and the range of camera/scene variability that is found in the population of cameras considered for analysis. In one example, the population may not include imagery from cameras that have severe issues in which classifying "wetness" vs. "not wetness" is not possible.
2. Classify the images "wet" or "not-wet" by a human observer (for example). Alternatively, other means, such as automated processor classification may be used.
3. Bifurcate the population into training and testing sets. Typical approaches, known by a person skilled in the art, may be used in this process.
4. Using one of the statistical analysis methods (e.g., regression/neural network methods) form a transform that accurately predicts the output (wet vs. not wet) from a set of features.
5. Apply the above to any camera of interest using at least two images as input data to:
    a. Compute Features, and
    b. Use the features to classify the image.

Figure 9:
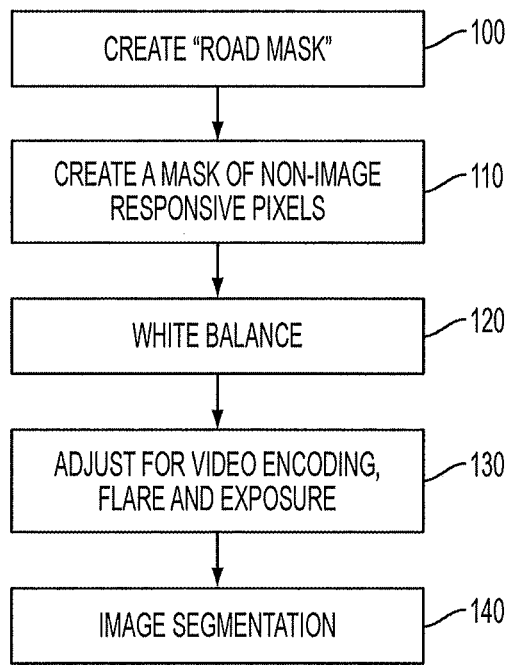
FIG. 9 is an example of a flow diagram illustrating the steps of an image processing in accordance with an embodiment of the present invention.
Figure 10:
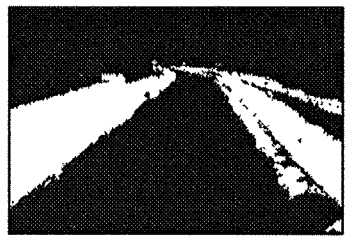
FIG. 10 is an example image of a road mask according to an embodiment of the present invention.

Prior to computing features, there are a number of image processing steps that may be performed, such as illustrated in FIG. 9. At step 100, a "road mask" image is formed. Specifically, this image is computed using a set of images from a given camera. For example, the selection and computation may be performed by the camera selection and analytics module 18. In one example, for each image in the set, the location of each vehicle is identified. Then, over a span of multiple images, the location of the vehicles may be used to indicate a locus of points that represent the road surface. An example of a road mask image is shown in FIG. 10.

Figure 11A:
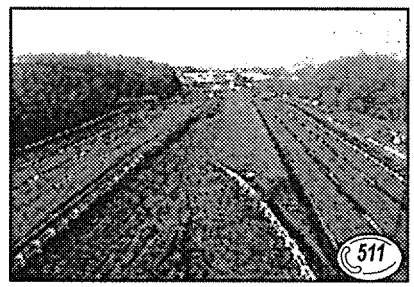
FIG. 11$a$ is an example of an original image according to an embodiment of the present invention.
Figure 11B:
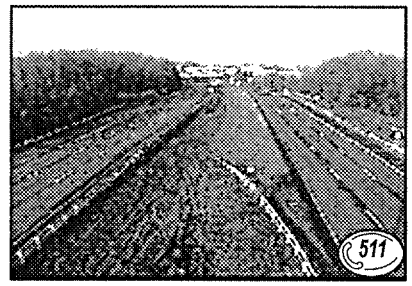

At step 110, a mask of non-image responsive pixels is formed. For example, this may be formed by subtracting the reference image from the detected image. This may be effective in detecting text, banners and logo. Clipped pixels may also be removed. At step 120, white balancing is performed. For example, the location of a road surface may be known and assumed to be neutral (i.e. Red=Green=Blue). This may be used to compute white balance terms that are applied to both the reference image and the detection image. This may reduce white balance variability from one camera to another. The white balance may be applied to linearized (linear with reflectance) image data to maintain neutrals throughout the tone scale. At step 130, video encoding, flare and exposure are adjusted. The reference image may be adjusted for flare, video encoding offset and exposure by assuming that the image contains both black and white pixels. This may be a good assumption for an image captured during mid-day sun. The image may be transformed into a linear luminance (gray scale) image then median filtered to remove any pixels that are oversharpened and thus modify the image histogram. For example, the 0.5% and 95.5% spots on the image histogram may be identified and then the image histogram may be stretched so that it fills the 0-255 code space. The same parameters used to transform the reference image may also be applied to the detection image. This is done to preserve the relative differences between images. An example of an adjusted video encoding, flare and exposure image is shown in FIG. 11*b* and may be compared to the original image shown in FIG. 11*a*.

At step 140, image segmentation may be performed. For example, image segmentation may be performed for grass, sky, and other components in the image. Using the reference image, grass/foliage and sky regions of the image may be identified. For example, for grass/foliage identification, hue angle may be specific to greenish, saturation may be greater than in a road, and the luma may not be black or very dark. Pixels may not intersect with road pixels.

Figure 12A:
FIG. 12$a$ is an example image of grass/foliage identification in accordance with an embodiment of the present invention.
Figure 12B:
Figure 12C:

An example image of grass/foliage identification is shown in FIG. 12*a*. For sky identification, the hue angle may be specific to blueish, saturation may be greater than in the road, and luma may not be black or very dark. Pixels may not intersect with road pixels. An example image of sky identification is shown in FIG. 12b. For other region identification, the set of pixels that are not road, sky or grass/foliage, may be used. An example image of other region identification is shown in FIG. 12c. Images of FIGS. 11b and 12a-c may be compared to FIG. 11a (original image) in applying the different steps of the image processing performed by the camera selection and analytics module 18.

In addition, multiple features of the images may be identified. Each feature may be selected for its potential use in predicting the output (e.g., wet vs. not wet). Some features may be highly correlated and therefore can be considered redundant. Other features may not be highly predictive of the output. FIG. 15 shows an example of the description for the features.

In one embodiment of the present invention, there are at least 17 features computed for each of the 5 categories: Entire Image, Grass/Foliage, Sky and Other, as described above. Some of the features are derived from a YCbCr version of the image. The conversion from RGB to YCbCr is computed from the source image red, green and blue values using the following relationship:

$$Y=0.299*Red+0.587*Grn+0.114*Blu$$

$$Cb=-0.169*Red-0.331*Grn+0.5*Blu;$$

$$Cr=0.5*Red-0.418*Grn-0.081*Blu;$$

Unless otherwise indicated, all image statistics are generated from what is assumed to be non-linear image (monitor ready) RGB values directly from the JPEG image file. Linear space image values may be computed by inverting the assumed gamma-nonlinearity.

Hue is computed from the Cb, Cr components using:

$$Hue=atan2(Cr,Cb).$$

Saturation is computed from the Cb, Cr components using:

$$Sat=sqrt(Cr^2+Cb^2).$$

There are at least 10 more features that may be computed and derived from ratios of linear luminance (Y) values from the various categories. The ratios may be as follows:
 Road/Whole
 Road/Grass
 Road/Sky
 Road/Other
 Grass/Whole
 Grass/Sky
 Grass/Other
 Sky/Whole
 Sky/Other
 Other/Whole.

Furthermore, in order to train a classifier, feature vectors for each of the images in a training set may be classified. For example, this may be done by one or more human observers. Alternatively, this may be performed by a processor, for example, by the camera selection and analytics module 18. Using multiple human observers may be advantageous because it may preserve the ambiguity that exists in the classification process. FIG. 16 shows a classification scheme. The scheme anticipates future classifications. In one example, classifying wet vs. not wet, the classification may be converted to a single column of 1's for wet and 0's for not wet.

In one embodiment of the present invention, the process of forming a transform that converts image features to a predicted output may include the following steps:
1. Acquire a set of images that represent the range of weather conditions, scene content and camera characters (bad flare, tone scale, etc). In one example, the image data may not contain repeats as they may not increase the ability of the system to generalize. Further, no one characteristic should be over represented for that will cause the system to "favor" that characteristic in the sense that the error for that characteristic will be less at the expense of some other characteristic.
2. Categorize the each image by a human observer, for example. Alternatively, other means, may be employed. (Y matrix)
3. Extract the features: (X matrix)
4. Normalize the data such that each feature has zero mean and a standard deviation of 1 over the population of scenes, for example.
5. Compute a co-variance matrix on the X data and look for examples of high (e.g. >0.9) correlation. These features may be considered redundant. They may be either combined (e.g. averaged), or one of the two eliminated. They may also be a candidate for de-correlation by computing differences or ratios.
6. Compute the correlation of the features with the Y vector. Features with very low correlation are not predictive of the output. However there may be other relationships between the features that can be exploited. Consider ratios and differences of those features.
7. Compute the set of feature weights using:
 a. Stepwise Regression
 b. Partial Least Squares
 c. Logistical Regression
 d. Linear Regression
 e. Linear/Non-Linear Discriminate Analysis
 f. Neural Networks
8. Examine images with poor fit. Look for additional features or pre-processing that would provide a better fit.
9. It may be necessary to segment cameras into classes. For example images without grass/foliage may need to be segmented and that population will need to be "trained" separately.

Figure 13:
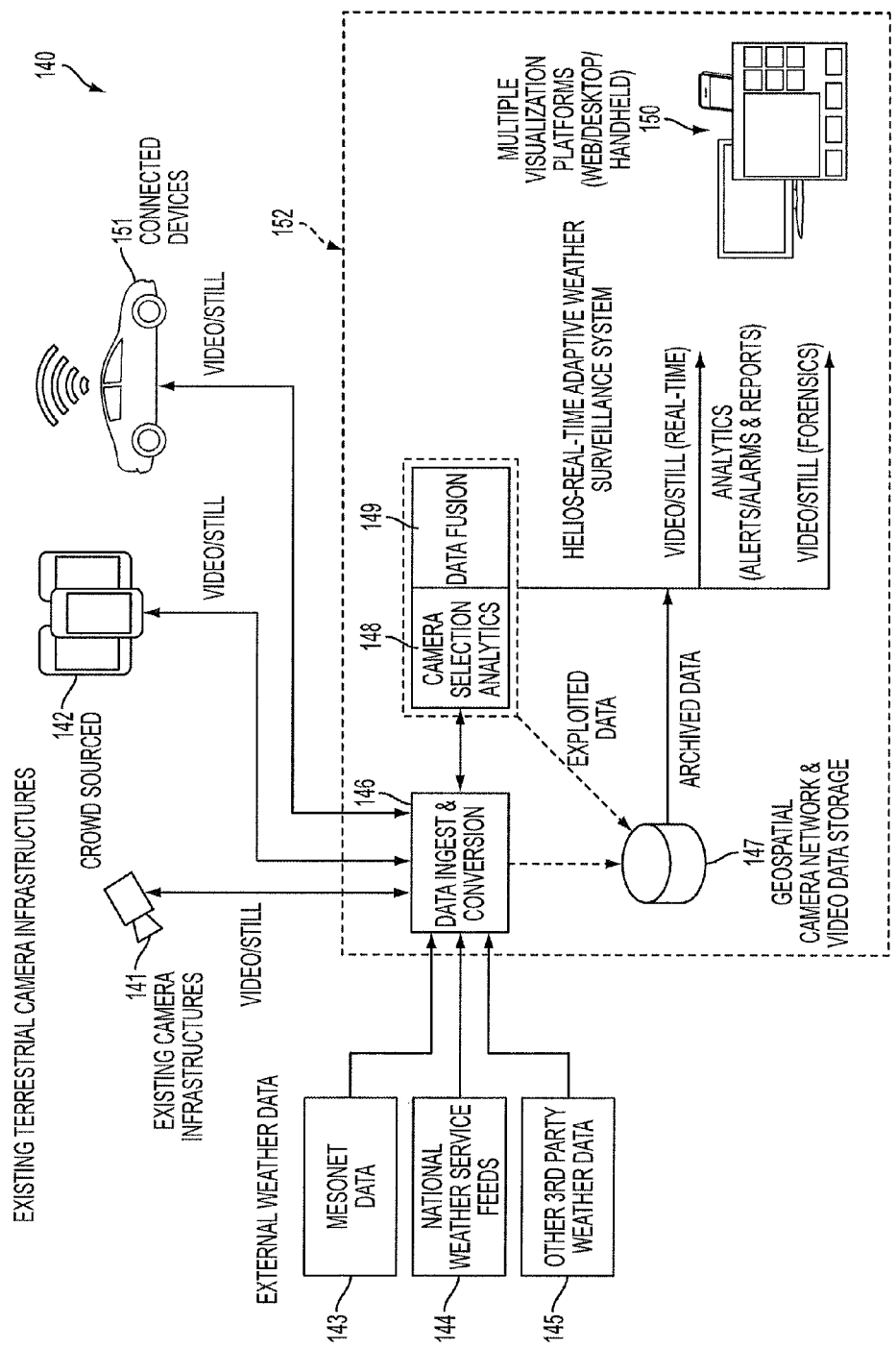
FIG. 13 is another exemplary real-time adaptive weather surveillance system, in accordance with an embodiment of the present invention.

In another embodiment of the present invention, system 140 may be able to ingest data from a mobile sensor platform 151 to receive accurate, hyper-local, real time sensor data, as shown in FIG. 13 in addition to the existing camera terrestrial camera infrastructures 141 and 142. It is contemplated that the mobile sensor 151 provide environmental data to the system 152 for mobile observations. Minimal observation data may include: location (x,y,z), air temp, relative humidity, barometric pressure, insolation, precipitation, ozone, CO, $CO_2$ and NOX. The collected data may then be processed by the camera selection and analytics unit 148.

In another embodiment of the present invention, system 10 and system 140 may include map navigation capabilities.

In one example, there may be three or four vertical Map Navigation buttons (depending on whether current internet browser version and operating system supports the GPS function). These may be visualized in the visualization platform 20 and also in the visualization platform 150, for example. The first button may be on the top of the screen that may "Zoom in" on the main map window. The button below that may "Zoom out". The zoom buttons may be oriented to the center of the main map. The third button below that may "Reset" the main map window to a default view (e.g., the Continental United States). The forth button below may "Zoom to GPS Location" (or "Locate Me") button. This button may be available if the browser and operating system support the GPS function. Clicking and holding the left mouse button may allow panning of the map in the desired direction.

In addition to the map navigation buttons, the system 10 or system 140 may respond with a scroll-wheel on a mouse (to Zoom In and Out), or a "Pinch-Expand" navigation function on a mobile device, for example. Clicking and dragging the mouse may allow panning of the map in a desired direction. By holding the <Shift> key down while dragging the mouse a "bounding box" may be created to zoom into a particular section of the map.

Furthermore, clicking the "Zoom to GPS Location" navigation button authorization window may be created for the browser. In one example, the system may ask for permission to utilize the built-in GPS navigation function to locate a user's current position. The accuracy of this position is dependent on several factors. For example, if the user is located in the Washington D.C. area and the ISP (Internet Service Provider) connection hub is located in Northern Virginia, the starting location of the user may be shown as being in Northern Virginia. If the user authorizes, the GPS location may be shared, causing the map to zoom in on the user's current location (as reported by the GPS function of the mobile device, or the location reported by the ISP).

In another embodiment of the present invention, the system may also provide Layers window in the visualization platforms. With the Layers window open, clicking a "Cameras" checkbox, for example, under a "Network" section, for example, may overlay the number of weather cameras available in any particular location. In one example, the visible limit for one camera "cluster" may be 500. This means that at that particular location, there may be more than 500 cameras available. As the user zooms in with the main map, the camera clusters may start to separate and closely represent the actual number of cameras in any one location based on the level of zoom. More cameras may be added to the system.

In one example, these camera "clusters" may be an interactive hot spot that when clicked will create a popup bubble showing the number of cameras around that spot along with a "Display Cameras" button. Clicking the "Display Cameras" button may open a "Camera Results" page and load clickable thumbnail images of the first 30 cameras on a page, for example. Scrolling to the bottom of the page, the user may find a "Previous" and "Next" button to page through the camera images, should there be more than one page of results. By clicking the "Back" button the user may be taken to the main map interface.

In another embodiment of the present invention, the system may include a "Details" button. For example, for a thunderstorm warning, this may provide in-depth information regarding the thunderstorm contained in a smaller interactive map of the thunderstorm area, along with images from three traffic web-cams in the area and an in-depth description of the issued alert with other relevant details. In another example, multiple available web-cams may have a camera's view direction noted along with their approximate position marked on the smaller interactive map. If more than three web-cams are available, the user may have the option to see all the available cameras by clicking the "View all cameras" link, for example, or page through the web-cams using the "Prev" and "Next" buttons. Some web-cams may provide the option to change the view direction. When that option is available, the user may change the direction from the "Direction" dropdown.

In another embodiment of the invention, the system may provide an "alerts" link. By clicking this link the user may receive a summary of all current alerts issued by the National Weather Service. Upon using a dropdown selector, the user may further filter the list to show a specific type of Alert. An example of an alert summary is shown in FIG. 14.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A weather surveillance system comprising:
    a data ingest module for receiving weather forecasts of a region,
    multiple cameras for viewing targets of interest and providing to the data ingest module imagery of a subset area within the weather forecast region,
    a camera selection analytics module coupled to the data ingest module for selecting at least one of the multiple cameras,
    a data fusion module coupled to the data ingest module for combining the received weather forecasts of the region with received imagery of the selected camera, and
    an output module providing combined data for output to verify the weather forecast in a target of interest,
    wherein the system is configured to:
        receive, by the data incest module, the weather forecast of a region predicting a weather event in the region from a weather service Provider;
        receive a request for confirmation of the predicted weather event in the weather forecast region;
        in response to the received request, select a camera within the weather forecast data region;
        receive, by the data ingest module, imagery of a subset area of the weather forecast region from the selected camera;
        identify an occurrence of the predicted weather event by analysis of an image in the received imagery;
        combine, by the data fusion module, the weather forecast data and the imagery that confirms the occurrence of the predicted weather event for visualization; and
        provide to the output module the combined weather data and imagery confirming an occurrence of the predicted weather event for output on a visualization platform.

2. The weather surveillance system of claim 1 wherein the output module includes a web-based service module for collecting, storing and disseminating the combined data to the user.

3. The weather surveillance system of claim 2, further comprising:
    a browser for communicating with the web-based service module.

4. The weather surveillance system of claim 3, further comprising:
    an application program for selecting, in response to a user input, the target of interest disposed in the region of weather forecast.

5. The weather surveillance system of claim 1, further comprising:
    a camera pointing module for controlling an angular position of a field of view of one camera of the multiple cameras,
    wherein the data ingest module is configured to receive the imagery in the field of view imaged by the one camera.

6. The weather surveillance system of claim 1, further comprising:
    a storage module for storing data received by the data ingest module.

7. The weather surveillance system of claim 1 wherein the multiple cameras include a closed circuit television camera.

8. The weather surveillance system of claim 1 wherein the multiple cameras include a hand-held camera of a smartphone.

9. The weather surveillance system of claim 1 further comprising:
a web application server communicating with the user for providing the fused data in response to the user request.

10. The weather surveillance system of claim 9, wherein:
the fused data includes an area of a map enclosed by a polygon and imagery received from a camera located within the polygon.

11. The weather surveillance system of claim 10, wherein:
the polygon is selected by the user via the Internet,
the camera is selected by the user via the Internet, and
the imagery is provided to the user from the web application server.

12. The weather surveillance system of claim 1, wherein:
the multiple cameras include at least a closed circuit television camera and a hand-held camera of a smart phone.

13. The weather surveillance system of claim 1 wherein the analytics module includes:
a wetness determination module for determining whether the imagery of at least one of the targets of interest includes a wet region,
wherein wetness is defined as including rain or snow in the imagery.

14. The weather surveillance system of claim 13 wherein the wetness determination module includes:
a comparison module for comparing a reference image with a detection image and outputting a decision of wetness,
wherein the reference image is previously obtained and the detection image is presently obtained, and
the detection image is judged against the reference image, prior to outputting the decision of wetness.

15. The weather surveillance system of claim 14 including:
a feature extraction module for extracting features from the reference and detection images, and
a classification module for classifying the detection image as including the wet region, in response to the extracted features.

16. The weather surveillance system of claim 15 wherein the classification module includes a neural network for training the wetness determination module.

17. The weather surveillance system of claim 13 wherein the imagery of one subset area includes multiple images of the subset area.

18. The weather surveillance system of claim 13 wherein the target of interest includes a road, and
the wetness determination is performed on the road.

19. The weather surveillance system of claim 13 including:
a masking module for masking portions of the detection image.

20. The weather surveillance system of claim 14 wherein the reference image includes an image of the target of interest viewed on a sunny day.

21. The weather surveillance system of claim 15 wherein the extracted features include ratios of luminance values of a grass region and a sky region; and a road region and a grass region.

22. A method for weather surveillance comprising the steps of:
receiving weather forecast data of a region predicting a weather event in the region from a weather service provider;
receiving a request for weather confirmation of the predicted weather event in the weather forecast data region;
in response to the received request, selecting a camera within the weather forecast data region;
receiving imagery of a subset area of the weather forecast data region from the selected camera;
identifying an occurrence of the predicted weather event by analysis of an image in the received imagery;
combining the weather forecast data and the imagery that confirms the occurrence of the predicted weather event for visualization; and
providing the combined weather forecast data and imagery as confirmation of an occurrence of the predicted weather event for output on a visualization platform.

23. The method of claim 22 including the steps of:
requesting, by the user, imagery of the subset area of the region of interest from a specific angular direction; and
providing the combined data includes providing the imagery from the specific angular direction requested by the user.

24. The method of claim 23 wherein combining the data includes providing
(a) a diagonal enclosing a region on a map, in response to the request from the user, and
(b) imagery of the subset area is located within the diagonal on the map.

25. The method of claim 22 including the step of:
pointing the camera, in response to a selection by the user, at a specific angular direction.

* * * * *